(12) United States Patent
Shindo et al.

(10) Patent No.: US 7,530,905 B2
(45) Date of Patent: May 12, 2009

(54) MOLDED RUBBER MATERIAL FOR GOLF BALL, METHOD OF PRODUCING THE MATERIAL, AND GOLF BALL

(75) Inventors: Jun Shindo, Chichibu (JP); Atsushi Nanba, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 0 days.

(21) Appl. No.: 11/360,428

(22) Filed: Feb. 24, 2006

(65) Prior Publication Data

US 2007/0202965 A1    Aug. 30, 2007

(51) Int. Cl.
*A63B 37/00* (2006.01)
(52) U.S. Cl. ........................................... 473/351
(58) Field of Classification Search ................... 473/351
See application file for complete search history.

(56) References Cited

U.S. PATENT DOCUMENTS 4,561,657 A    12/1985    Tominaga et al.
5,789,616 A    8/1998    Kobayashi et al.
6,953,404 B2 *    10/2005    Jordan ........................ 473/378

FOREIGN PATENT DOCUMENTS

| JP | 59-141961 A | 8/1984 |
| JP | 60-92781 A | 5/1985 |
| JP | 9-202747 A | 8/1997 |

* cited by examiner

*Primary Examiner*—Raeann Trimiew
(74) *Attorney, Agent, or Firm*—Sughrue Mion, PLLC

(57) ABSTRACT

The invention provides a molded rubber material for a golf ball which is obtained by molding and vulcanizing a rubber composition that includes a portion of a master batch prepared by mixing together a synthetic rubber, an unsaturated carboxylic acid metal salt and a higher fatty acid or metal salt thereof, and includes also a diene rubber and an organic peroxide, wherein the master batch is prepared at a maximum temperature attained during preparation of above 110° C. Also disclosed are a method of producing such a molded rubber material, and a golf ball in which such a molded rubber material is used as a component of the ball. Use of the molded rubber material as a golf ball core enables a good core hardness under load and a good core resilience to be achieved.

15 Claims, No Drawings

MOLDED RUBBER MATERIAL FOR GOLF BALL, METHOD OF PRODUCING THE MATERIAL, AND GOLF BALL

BACKGROUND OF THE INVENTION

The present invention relates to a molded rubber material suitable for use as a golf ball material, particularly a spherical molded rubber material suitable as the core material in solid golf balls such as two-piece and three-piece golf balls. More specifically, the invention relates to a molded rubber material for golf balls which has a suitable hardness and resilience and an excellent durability. The invention additionally relates to a method of producing such a material, and to a golf ball in which such a material is used.

One-piece golf balls, and the solid cores which are enclosed, either directly or over an intervening mantle layer, by a cover in multi-piece golf balls, can be obtained by molding under applied heat and pressure a rubber composition made up of a rubber component such as polybutadiene as the base material and containing also an unsaturated carboxylic acid metal salt (e.g., zinc acrylate), dicumyl peroxide, and other ingredients. The unsaturated carboxylic acid metal salt serves primarily as a co-crosslinking agent or a crosslinking aid in the rubber composition, and has a large influence on the crosslink structure and crosslink density of the rubber. The unsaturated carboxylic acid metal salt is most preferably zinc methacrylate or zinc acrylate. This zinc methacrylate or zinc acrylate is generally incorporated in a large amount with respect to the rubber component such as polybutadiene. When the various ingredients are mixed and worked together to form the rubber, it is known that if the dispersion is not uniform, the molded material subsequently obtained will have diminished physical properties such as hardness, resilience and durability.

To resolve such problems, methods involving the use of zinc acrylate surface-coated with a higher fatty acid such as stearic acid or a metal salt thereof (JP-A 59-141961, JP-A 60-92781) have been disclosed. Other methods that have been disclosed include a method involving the use of zinc acrylate obtained by dispersing zinc oxide in an organic solvent within the presence of an anionic surfactant while concurrently reacting the zinc oxide with acrylic acid and a higher fatty acid in the organic solvent (JP-A 9-202747), and a method involving the use of zinc acrylate that has been dry-blended with solid rubber.

However, while the above methods all improve the dispersibility of zinc acrylate added to a rubber composition relative to the pre-existing art, there remains room for improvement in the hardness, resilience and durability of the spherical molded rubber material obtained with crosslinking.

SUMMARY OF THE INVENTION

It is therefore an object of the present invention to provide a molded rubber material of suitable hardness and resilience and excellent durability made from a rubber composition within which the dispersibility of the unsaturated carboxylic acid metal salt has been further increased. Another object of the invention is to provide a method of producing such a molded rubber material. Yet another object is to provide a golf ball in which such a molded rubber material is used.

On conducting extensive investigations to achieve these objects, we have discovered that, in a rubber composition prepared using a preliminary mixture which is composed of a portion of the diene rubber to be included in the composition, an unsaturated carboxylic acid metal salt and a higher fatty acid or metal salt thereof and which is obtained at a maximum attained temperature of above 110° C., the dispersibility of the unsaturated carboxylic acid metal salt is very high. We have also found that when such a rubber composition is molded under heat and pressure, a golf ball of suitable hardness and resilience and excellent durability can be obtained.

Accordingly, in a first aspect, the present invention provides a molded rubber material for a golf ball, obtained by molding and vulcanizing a rubber composition which includes a portion of a master batch prepared by mixing together a synthetic rubber, an unsaturated carboxylic acid metal salt and a higher fatty acid or metal salt thereof, and includes also a diene rubber and an organic peroxide, wherein the master batch is prepared at a maximum temperature attained during preparation of above 110° C.

In a second aspect, the invention provides a golf ball in the form of a one-piece golf ball or a golf ball that includes a core and one or more layer enclosing the core, wherein the one-piece golf ball or core is formed from the foregoing molded rubber material.

In a third aspect, the invention provides a method of producing a molded rubber material for a golf ball, which method includes the steps of mixing together a synthetic rubber, an unsaturated carboxylic acid metal salt and a higher fatty acid or metal salt thereof to prepare a master batch, mixing a portion of the master batch with a diene rubber and an organic peroxide to prepare a rubber composition, and molding and vulcanizing the rubber composition to form a molded rubber material; wherein the maximum temperature attained during preparation is set above 110° C.

DETAILED DESCRIPTION OF THE INVENTION

The invention is described more fully below.

In the invention, a rubber composition is formed using a master batch obtained by mixing together (i) a synthetic rubber, (ii) an unsaturated carboxylic acid metal salt, and (iii) a higher fatty acid or a metal salt thereof.

The synthetic rubber serving as component (i) is preferably a diene rubber, and most preferably polybutadiene. The polybutadiene must have a cis-1,4 bond content of at least 60%, preferably at least 80%, more preferably at least 90%, and most preferably at least 95%, and must have a 1,2-vinyl bond content of not more than 2%, preferably not more than 1.7%, more preferably not more than 1.5%, and most preferably not more than 1.3%. Outside of the above range, the resilience of the molded rubber material decreases.

The polybutadiene may be synthesized using a metal catalyst such as a rare earth catalyst (e.g., a neodymium catalyst), a cobalt catalyst or a nickel catalyst.

Illustrative examples of the unsaturated carboxylic acid metal salt serving as component (ii) include the zinc salts and magnesium salts of carboxylic acids such as acrylic acid, methacrylic acid or maleic acid. The use of zinc acrylate or zinc methacrylate is especially preferred. These unsaturated carboxylic acid metal salts may be in a completely neutralized form as shown below, or in a partially neutralized form.

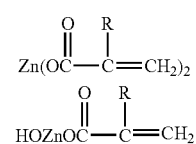

In the above formulas, R is a hydrogen atom or a methyl group.

Illustrative examples of the higher aliphatic acid serving as component (iii) include stearic acid, palmitic acid, oleic acid, linoleic acid, linolenic acid and myristic acid. Stearic acid is especially preferred. Illustrative examples of the metal salt of the higher aliphatic acid include the lithium salt, sodium salt, potassium salt, copper salt, magnesium salt, calcium salt, strontium salt, barium salt, tin salt, cobalt salt, nickel salt, zinc salt and aluminum salt. Zinc stearate is especially preferred.

When preparing the master batch from above components (i) to (iii), it is preferable to suitably adjust the amount of each component so that the master batch contains, per 100 parts by weight of the synthetic rubber (i), from 100 to 500 parts by weight, and especially from 150 to 300 parts by weight, of the unsaturated carboxylic acid metal salt (ii) and the higher fatty acid or metal salt (iii) combined. At less than 100 parts by weight, the unsaturated carboxylic acid metal salt (ii) becomes relatively scarce, which makes a crosslinking effect difficult to achieve. On the other hand, a combined amount of more than 500 parts by weight is excessive and may result in the lack of a clear crosslinking effect for the amount of addition.

The unsaturated carboxylic acid metal salt (ii) and the higher fatty acid or metal salt thereof (iii) are included in a weight ratio of the unsaturated carboxylic acid metal salt (ii) to the higher fatty acid or metal salt thereof (iii) of preferably from 95/5 to 60/40, and more preferably from 90/10 to 70/30. This compounding ratio takes into account, and maintains a proper balance between, the role of the unsaturated carboxylic acid metal salt (ii) as a co-crosslinking agent and the role of the higher fatty acid or metal salt thereof (iii) in achieving uniform dispersion of the unsaturated carboxylic acid metal salt (ii) within the rubber and activating the organic peroxide-induced reaction of the rubber with the unsaturated carboxylic acid metal salt. Outside of the above weight ratio range, the effect of the unsaturated carboxylic acid metal salt as a co-crosslinking agent diminishes, which may lower the hardness, durability and resilience of the molded rubber material.

No particular limitation is imposed on the mixture or compound of the unsaturated carboxylic acid metal salt (ii) and the higher fatty acid or metal salt thereof (iii). For example, the mixture or compound may be obtained by either of the following methods.

In one method, zinc oxide is dispersed in an organic solvent in the presence of an anionic surfactant while at the same time reacting acrylic acid and a higher fatty acid with the zinc oxide to form an unsaturated carboxylic acid metal salt such as zinc acrylate (see JP-A 9-202747).

In another method, a higher fatty acid such as stearic acid is heated and dissolved in an organic solvent, following which zinc acrylate is mixed into the solution to form a slurry-like state, thereby coating the surface of the zinc acrylate particles with the higher fatty acid (see JP-A 59-141961).

Conditions during preparation of the master batch are as follows. Using a closed mixer such as a pressure kneader, the unsaturated carboxylic acid metal salt and the higher fatty acid or metal salt thereof are added in several divided portions to the entire amount of synthetic rubber and mixing is carried out for about 1 to 10 minutes at a mixer temperature setting of 80 to 100° C. and a rotor speed of 30 to 50 rpm. Once the maximum temperature attained by the master batch has exceeded 110° C., it is preferable to then continue mixing for another 10 seconds to 5 minutes.

In the practice of the invention, the maximum temperature attained during compounding of the various ingredients must be above 110° C., and preferably at least 115° C. The maximum temperature attained is preferably not more than 180° C., and more preferably not more than 150° C. At a maximum temperature attained of less than 110° C., the dispersibility of the unsaturated carboxylic acid metal salt (ii) falls short of what is desired. On the other hand, at a maximum temperature attained of more than 180° C., deterioration of the various compounding ingredients becomes a concern. Once the maximum temperature has been attained, the master batch must be held at that temperature for at least 15 seconds, and preferably at least 20 seconds. Although there is no particular upper limit on the length of time the maximum temperature attained is held, for reasons having to do with cost, it is preferable to keep this period to 2 minutes or less. Preparing the mixture at such a high temperature makes it possible to increase the compounding ratio of the unsaturated carboxylic acid with respect to the diene base rubber and uniformly disperse the unsaturated carboxylic acid within the rubber, in addition to which the resulting molded and crosslinked material can be conferred with a suitable rubber hardness and resilience, and an excellent durability. Also, when the master batch obtained in this way is mixed together with a diene rubber and an organic peroxide to form a rubber composition, the rubber composition can be uniformly mixed even at a low temperature, which is economically advantageous.

In the present invention, there is obtained a rubber composition for making golf balls which includes, together with a portion of the above-described master batch:

(A) a diene rubber, and (B) an organic peroxide;

and which optionally includes as well (C) a processing aid, and (D) an organosulfur compound.

It is preferable here to adjust the amount of unsaturated carboxylic acid metal salt included in the rubber composition for golf balls to from 10 to 50 parts by weight, and particularly 15 to 40 parts by weight, per 100 parts by weight of the rubber component within the rubber composition.

The diene rubber (A) is preferably a polybutadiene rubber of the same type as that serving as component (i) above. If necessary, other diene rubbers, such as styrene-butadiene rubber, natural rubber, isoprene rubber and ethylene-propylene-diene rubber, may also be compounded insofar as the objects of the invention are attainable.

The organic peroxide (B) is included in the rubber composition as a free-radical initiator. Exemplary organic peroxides are dicumyl peroxide and 1,1-(t-butylperoxy)-3,3,5-trimethylcyclohexane. These organic peroxides may be commercial products, illustrative examples of which include Percumyl D (NOF Corporation), Perhexa 3M (NOF Corporation), Perhexa C (NOF Corporation), and Luperco 231XL (Atochem Co.). If necessary, two or more different organic peroxides may be mixed and used together.

The organic peroxide is included in an amount, per 100 parts by weight of the rubber component in the above rubber composition, of at least 0.1 part by weight, preferably at least 0.2 part by weight, and more preferably at least 0.3 part by weight, but not more than 5 parts by weight, preferably not more than 4 parts by weight, even more preferably not more than 3 parts by weight, and most preferably not more than 2 parts by weight.

The processing aid (C) which may be included in the rubber composition is one having a maximum melting point of not more than 115° C., preferably not more than 110° C., more preferably not more than 108° C., and most preferably not more than 105° C. It is advantageous for the melting point to be at least 60° C., preferably at least 70° C., more preferably at least 80° C., and most preferably at least 90° C.

Examples of such processing aids include:
(a) higher fatty acid metal salts,
(b) metal complexes,
(c) organosulfur compounds,
(d) aliphatic hydrocarbons,
(e) fatty acid esters, and
(f) aliphatic alcohols.

These may be used singly or as combinations of two or more thereof.

The processing aid is composed primarily of (a) a higher fatty acid metal salt. Specific examples include those available from Rhein Chemie under the trade names Aktiplast GT, Aktiplast PP, Aktiplast M, Aktiplast T, Aktiplast 8, Aktiplast ST, Aflux 12 and Aflux 42. Of these, Aktiplast GT and Aktiplast PP are preferred.

The metal complex (b) is a phthalocyanine metal complex. Specific examples include tetraazaporphin and hemiporphyrazine metal complexes, particularly those listed in column 4, line 37 to column 5, line 3 of U.S. Pat. No. 3,839,250.

An organosulfur compound (c) that may be used is 2,2'-dibenzamido diphenyldisulfide (DBD). This organosulfur compound (iii) may be added beforehand to the processing aid, particularly a higher fatty acid metal salt, as one component of the processing aid.

It is desirable for the aliphatic hydrocarbon (d) to be one having at least 11, preferably at least 13, and more preferably at least 15 carbons, but not more than 31, more preferably not more than 27, and even more preferably not more than 24 carbons.

It is advantageous for the fatty acid ester (e) to be a higher fatty acid ester of the formula RCOOR', wherein the number of carbons in R is at least 11, preferably at least 13, and more preferably at least 15, but not more than 31, preferably not more than 27, and more preferably not more than 24; and the number of carbons in R' is at least 11, preferably at least 13, and more preferably at least 15, but not more than 31, preferably not more than 27, and more preferably not more than 24.

The aliphatic alcohol (f) is preferably a higher aliphatic alcohol. A higher aliphatic alcohol in which the number of carbons is at least 11, preferably at least 13, and more preferably at least 15, but not more than 31, preferably not more than 27, and more preferably not more than 24, is especially desirable.

The above processing aid (C) is included within the rubber composition in an amount, per 100 parts by weight of the rubber component, of at least 2 parts by weight, preferably at least 6 parts by weight, more preferably at least 8 parts by weight, even more preferably at least 10 parts by weight, and most preferably at least 12 parts by weight, but preferably not more than 30 parts by weight, more preferably not more than 27 parts by weight, even more preferably not more than 24 parts by weight, still more preferably not more than 20 parts by weight, and most preferably not more than 15 parts by weight.

The organosulfur compound (D) is a substance added directly to the rubber compound. Examples include thiophenols, thionaphthols, halogenated thiophenols, and metal salts thereof. Specific examples include the zinc salts of pentachlorothiophenol, pentafluorothiophenol, pentabromothiophenol and p-chlorothiophenol; diphenylpolysulfides, dibenzylpolysulfides, dibenzoylpolysulfides, dibenzothiazoylpolysulfides, dithiobenzoylpolysulfides and alkylphenyldisulfides having 2 to 4 sulfurs; furan ring-bearing sulfur compounds; and thiophene ring-bearing sulfur compounds. Diphenyldisulfide and the zinc salt of pentachlorothiophenol are especially preferred. It is advantageous to include the organosulfur compound (D) in an amount, per 100 parts by weight of the rubber component in the rubber composition, of at least 0.2 part by weight, preferably at least 0.3 part by weight, more preferably at least 0.5 part by weight, and most preferably at least 0.7 part by weight, but not more than 5 parts by weight, more preferably not more than 4 parts by weight, even more preferably not more than 3 parts by weight, and most preferably not more than 2 parts by weight.

In addition, various additives that are commonly used in the production of one-piece golf balls and the solid core of solid golf balls having a multi-layer construction, such as zinc oxide, fillers and antioxidants, may be suitably molded if necessary.

In the practice of the invention, when an unsaturated carboxylic acid metal salt such as zinc methacrylate or zinc acrylate is included as a co-crosslinking agent during the preparation of the above-described rubber composition, the preparation of a master batch and its use to obtain the final rubber composition in the manner described above makes it possible, without using a solvent or liquid rubber as in the prior art, to largely prevent a decrease in the amount of the co-crosslinking agent dispersed in the composition due to scattering of the co-crosslinking agent and deposition on the mixer rotor and elsewhere, and moreover enables the co-crosslinking agent to be uniformly and effectively dispersed without aggregating into masses.

The rubber composition is then masticated using a suitable apparatus, such as a roll mill, kneader or Banbury mixer, after which it is molded under heat and pressure in a mold, thereby producing a one-piece golf ball or a solid core or thread-wound core for a solid golf ball having a multi-layer construction. Molding and vulcanization may be carried out under conventional conditions.

When a solid golf ball having a multi-layer construction, such as two-piece ball, is produced, the cover envelopes, either directly or over an intervening mantle layer, the solid core made of the above-described rubber composition. In such a case, it is preferable to use conventional cover materials, such as an ionomer resin, polyester, polyurethane or nylon, as the mantle layer and cover materials.

EXAMPLES

The following Examples of the invention and Comparative Examples are provided by way of illustration and not by way of limitation.

Preparation of Master Batch

Master Batches A, B and D were prepared by charging a pressure kneader preheated to 90° C. with the polybutadiene rubber shown in Table 1 below and masticating the rubber, subsequently adding zinc acrylate in the amount shown in Table 1 below (total amount) in three divided portions, checking 3 minutes later that the maximum temperature attained by the mixture had reached 115° C., then working the mixture an additional 30 seconds. The maximum temperature attained by the mixture in Master Batch C below was set at 90° C.

TABLE 1

| Ingredient (pbw) | A | B | C | D |
|---|---|---|---|---|
| Polybutadiene rubber[1)] | 100 | 100 | 100 | 100 |
| Zinc acrylate 1[2)] | 300 | | 300 | |

TABLE 1-continued

| Ingredient (pbw) | A | B | C | D |
|---|---|---|---|---|
| Zinc acrylate 2[3] | | 300 | | |
| Zinc acrylate 3[4] | | | | 300 |
| Maximum temperature attained (° C.) | 115 | 115 | 90 | 115 |

Notes:
[1] Polybutadiene rubber: cis-1,4-Polybutadiene (produced by JSR Corporation under the trade name BR730).
[2] Zinc acrylate 1: Zinc acrylate/zinc stearate mixture obtained by forming zinc acrylate and zinc stearate in the same reactor. Zinc acrylate purity, 85%.
[3] Zinc acrylate 2: A dry blend of zinc stearate in 100% pure zinc acrylate. Zinc acrylate content of mixed powder, 85%.
[4] Zinc acrylate 3: Zinc acrylate having a purity of 100%.

Preparation of Rubber Composition

Next, rubber compositions were prepared by mixing together the ingredients in the amounts (parts by weight) shown in Table 2 in a kneader. The compositions were then molded under pressure in a mold at 160° C. for 20 minutes, giving solid cores having a diameter of 37.3 mm and a weight of 31.9 g.

TABLE 2

| | Example | | Comparative Example | |
|---|---|---|---|---|
| Ingredient (pbw) | 1 | 2 | 1 | 2 |
| Polybutadiene rubber | 92.5 | 92.5 | 92.5 | 93.6 |
| Master batch A | 30 | | | |
| Master batch B | | 30 | | |
| Master batch C | | | 30 | |
| Master batch D | | | | 25.5 |
| Zinc oxide | 24 | 24 | 24 | 24 |
| Antioxidant[5] | 0.1 | 0.1 | 0.1 | 0.1 |
| Zinc stearate | | | | 3.38 |
| Organic peroxide[6] | 0.45 | 0.45 | 0.45 | 0.45 |
| Temperature attained (° C.) | 90 | 90 | 90 | 90 |
| Actual amount of polybutadiene rubber | 100 | 100 | 100 | 100 |
| Actual amount of zinc acrylate | 19.13 | 19.13 | 19.13 | 19.13 |
| Actual amount of zinc stearate | 3.38 | 3.38 | 3.38 | 3.38 |

Notes:
[5] Antioxidant: 2,2-Methylenebis(4-methyl-6-butylphenol), produced by Ouchi Shinko Chemical Industry Co., Ltd. under the trade name Nocrac NS-5.
[6] Organic peroxide: Dicumyl peroxide, produced by NOF Corporation under the trade name Percumyl D.

Evaluation

The core hardness under loading, core durability index and core rebound index for each of the solid cores obtained were determined by the methods described below. The results are shown in Table 3.

Core Hardness Under Loading:

The amount of deformation by the solid core when subjected to loading from an initial load of 10 kgf to a final load of 130 kgf was measured. A larger numerical value indicates a softer core.

Core Durability Index:

The durability of the core was evaluated using an ADC Ball COR Durability Tester produced by Automated Design Corporation (U.S.). This tester has the ability to fire a core using air pressure and cause it to repeatedly strike two metal plates arranged in parallel. The average number of firings needed until a sphere cracks was treated as the durability. The incident velocity of the core on the metal plates was 30 m/s. The value in each example was expressed as an index based on a value of "100" for the durability of the core in Comparative Example 1.

Core Resilience Index:

The initial velocity was measuring using an initial velocity measuring apparatus of the same type as that of the United States Golf Association (USGA)—the official golf ball regulating body. The result for each of Examples 1 and 2 and Comparative Examples 1 and 2 is expressed as the ratio of the initial velocity to the value obtained in Comparative Example 1.

TABLE 3

| | Example | | Comparative Example | |
|---|---|---|---|---|
| Evaluation | 1 | 2 | 1 | 2 |
| Core hardness under loading (mm) | 4.3 | 4.3 | 4.5 | 4.6 |
| Core durability index | 195 | 180 | 100 | 86 |
| Core rebound index | 1.003 | 1.002 | 1 | 0.999 |

The following is apparent from Table 3.

In Comparative Example 1, the core durability index was low because the ultimate temperature attained during preparation of the master batch was 90° C., and thus was not more than 110° C.

In Comparative Example 2, the core durability index was low because a higher fatty acid or higher fatty acid metal salt was not added during preparation of the master batch.

By contrast, in Examples 1 and 2 according to the invention, the core durability index was excellent, and both the core hardness under loading and the core rebound index was good.

The invention claimed is:

1. A molded rubber material for a golf ball, obtained by molding and vulcanizing a rubber composition comprising a master batch prepared by mixing together a synthetic rubber, an unsaturated carboxylic acid metal salt and a higher fatty acid or metal salt thereof, and comprising also a diene rubber and an organic peroxide, wherein the master batch contains, per 100 parts by weight of the synthetic rubber, 100 to 500 parts by weight of the unsaturated carboxylic acid metal salt and the higher fatty acid or metal salt thereof combined, and the master batch is prepared at a maximum temperature attained during preparation of above 110° C.

2. The molded rubber material for a golf ball of claim 1, wherein the unsaturated carboxylic acid metal salt and the higher fatty acid or metal salt thereof are included in a weight ratio of from 95:5 to 60:40.

3. The molded rubber material for a golf ball of claim 1, wherein the unsaturated carboxylic acid metal salt is zinc acrylate and/or zinc methacrylate.

4. The molded rubber material for a golf ball of claim 1, wherein the master batch and/or rubber composition includes one or more processing aid.

5. The molded rubber material for a golf ball of claim 4, wherein the processing aid is one or more selected from the group consisting of higher fatty acid metal salts, metal complexes, organosulfur compounds, aliphatic hydrocarbons, fatty acid esters and aliphatic alcohols.

6. The molded rubber material for a golf ball of claim 1, wherein the rubber composition additionally comprises an organosulfur compound.

7. A golf ball in the form of a one-piece golf ball or a golf ball that includes a core and one or more layer enclosing the core, wherein said one-piece golf ball or said core is formed from the molded rubber material of any one of claims 1 and 2 to 6.

8. The molded rubber material for a golf ball of claim 1, wherein the master batch contains, per 100 parts by weight of the synthetic rubber, 150 to 300 parts by weight of the unsaturated carboxylic acid metal salt and the higher fatty acid or metal salt thereof combined.

9. The molded rubber material for a golf ball of claim 1, wherein the unsaturated carboxylic acid metal salt and the higher fatty acid or metal salt thereof are included in a weight ratio of from 90:10 to 70:30.

10. The molded rubber material for a golf ball of claim 1, wherein the maximum temperature attained during preparation in the master batch is at least 115° C.

11. The molded rubber material, for a golf ball of claim 1, wherein the maximum temperature attained during preparation in the master batch is not more than 180° C.

12. The molded rubber material for a golf ball of claim 1, wherein the master batch is held at that temperature for at least 15 seconds when the maximum temperature has been attained.

13. The molded rubber material for a golf ball of claim 1, wherein the amount of unsaturated carboxylic acid metal salt included in the rubber composition is from 10 to 50 parts by weight, per 100 parts by weight of the rubber component within the rubber composition.

14. The molded rubber material for a golf ball of claim 1, wherein the diene rubber is a polybutadiene rubber of the same type as the synthetic rubber used in the master batch.

15. The molded rubber material for a golf ball of claim 14, wherein the polybutadiene is synthesized using a rare earth catalyst.

* * * * *